United States Patent
Bender et al.

(10) Patent No.: US 10,929,817 B2
(45) Date of Patent: Feb. 23, 2021

(54) SCHEDULING PROGRAMMING EVENTS FOR USERS CLASSIFIED AS HAVING SIMILAR MEDICAL CONDITIONS UTILIZING NATURAL LANGUAGE PROCESSING

(71) Applicant: INTERNATIONAL BUSINESS MACHINES CORPORATION, Armonk, NY (US)

(72) Inventors: Michael Bender, Rye Brook, NY (US); Gregory J. Boss, Saginaw, MI (US); Jeremy R. Fox, Georgetown, TX (US); Kelley Anders, East New Market, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 15/819,194

(22) Filed: Nov. 21, 2017

(65) Prior Publication Data
US 2019/0156294 A1 May 23, 2019

(51) Int. Cl.
*G06Q 10/10* (2012.01)
*G06Q 50/00* (2012.01)

(52) U.S. Cl.
CPC ........ *G06Q 10/1095* (2013.01); *G06Q 50/01* (2013.01)

(58) Field of Classification Search
CPC .............. G06Q 10/1095; G06Q 50/01; G06Q 10/1093; G06Q 50/205; A61B 5/002; A61B 5/00222
See application file for complete search history.

(56) References Cited

U.S. PATENT DOCUMENTS

| | | | | |
|---|---|---|---|---|
| 6,039,688 A | * | 3/2000 | Douglas | G06F 19/3475 600/300 |
| 6,381,577 B1 | * | 4/2002 | Brown | A61B 5/0002 705/2 |
| 7,321,862 B2 | * | 1/2008 | Rosenfeld | G16H 50/20 705/3 |

(Continued)

OTHER PUBLICATIONS

IBM Unveils Expanded Watson Platform for Health Cloud Capabilities and Introduces the Watson Health Consulting Services Unit at HIMSS17, http://www-03.ibm.com/press/us/en/pressrelease/51645.wss, Feb. 20, 2017, 3 pages.

(Continued)

*Primary Examiner* — Scott L Jarrett
(74) *Attorney, Agent, or Firm* — Brian Restauro; Andrew D. Wright; Roberts, Calderon, Safran & Cole, P.C.

(57) ABSTRACT

Systems and methods for digitally grouping users are disclosed. A method includes: receiving user attribute information from a user computer device and service provider attribute information from a service provider computer device; analyzing the user attribute information and the service provider attribute information based on the receiving; classifying the user attribute information and the service provider attribute information into a digital user group based on the analyzing; and scheduling an programming event for a user of the user computer device based on the classifying.

17 Claims, 6 Drawing Sheets

(56) References Cited

U.S. PATENT DOCUMENTS

| | | | | |
|---|---|---|---|---|
| 7,856,362 | B2* | 12/2010 | Walker | G06F 19/326 |
| | | | | 705/2 |
| 8,123,683 | B2* | 2/2012 | Stupp | G06F 17/18 |
| | | | | 600/300 |
| 8,341,101 | B1 | 12/2012 | Treiser | |
| 8,473,308 | B2* | 6/2013 | Fackler | G06F 19/3418 |
| | | | | 705/2 |
| 8,655,675 | B2* | 2/2014 | Kil | G06F 19/3475 |
| | | | | 705/2 |
| 9,049,259 | B2 | 6/2015 | Rathod | |
| 9,202,233 | B1* | 12/2015 | Siegel | G06Q 30/0252 |
| 9,256,645 | B2* | 2/2016 | Hussam | G06F 19/324 |
| 9,552,637 | B2 | 1/2017 | Mcvey | |
| 9,589,231 | B2* | 3/2017 | Csurka | G06N 5/04 |
| 9,614,920 | B1* | 4/2017 | Agarwal | H04L 67/22 |
| 9,754,243 | B2* | 9/2017 | Goldsmith | G06Q 10/06 |
| 10,242,386 | B2 | 3/2019 | Hong et al. | |
| 10,325,289 | B2 | 6/2019 | Koran | |
| 10,504,136 | B2 | 12/2019 | Kemp et al. | |
| 10,636,525 | B2* | 4/2020 | Jiao | G16H 40/20 |
| 2002/0077858 | A1* | 6/2002 | Haines | G06F 19/3418 |
| | | | | 705/3 |
| 2003/0061072 | A1 | 3/2003 | Baker et al. | |
| 2009/0037470 | A1* | 2/2009 | Schmidt | G16H 10/60 |
| 2009/0131758 | A1* | 5/2009 | Heywood | A61B 5/0002 |
| | | | | 600/300 |
| 2009/0276487 | A1* | 11/2009 | Jensen | G06F 19/3418 |
| | | | | 709/203 |
| 2009/0326979 | A1* | 12/2009 | Ryan | G06F 19/3418 |
| | | | | 705/2 |
| 2011/0153344 | A1* | 6/2011 | Vesto | G06Q 10/10 |
| | | | | 705/2 |
| 2012/0066140 | A1* | 3/2012 | Hegeman | G06Q 10/10 |
| | | | | 705/319 |
| 2012/0116804 | A1* | 5/2012 | Mesika | G06Q 50/24 |
| | | | | 705/3 |
| 2012/0129139 | A1* | 5/2012 | Partovi | G06F 19/3418 |
| | | | | 434/262 |
| 2012/0173256 | A1* | 7/2012 | Kishon | G06Q 30/01 |
| | | | | 705/2 |
| 2013/0017807 | A1* | 1/2013 | Rooyen | H04W 4/18 |
| | | | | 455/414.1 |
| 2013/0035946 | A1* | 2/2013 | Ratan | G06F 19/3418 |
| | | | | 705/2 |
| 2013/0132113 | A1* | 5/2013 | Drobac | G06Q 50/22 |
| | | | | 705/2 |
| 2013/0159011 | A1* | 6/2013 | Leville | G06F 19/3475 |
| | | | | 705/2 |
| 2013/0290458 | A1* | 10/2013 | Morris | H04L 51/00 |
| | | | | 709/206 |
| 2014/0025654 | A1* | 1/2014 | Brown | G06Q 30/02 |
| | | | | 707/705 |
| 2014/0257047 | A1* | 9/2014 | Sillay | A61B 5/11 |
| | | | | 600/301 |
| 2014/0280576 | A1 | 9/2014 | Cowan | |
| 2014/0297633 | A1* | 10/2014 | Brooks | G06Q 50/01 |
| | | | | 707/733 |
| 2014/0310015 | A1* | 10/2014 | Goldner | G16H 10/20 |
| | | | | 705/2 |
| 2014/0344397 | A1* | 11/2014 | Kostoff | H04L 67/306 |
| | | | | 709/217 |
| 2015/0074109 | A1* | 3/2015 | Erickson | G06F 16/285 |
| | | | | 707/737 |
| 2015/0081327 | A1* | 3/2015 | Mooker | G06Q 10/1095 |
| | | | | 705/2 |
| 2015/0100512 | A1* | 4/2015 | Mishra | G06Q 50/205 |
| | | | | 705/326 |
| 2015/0170045 | A1* | 6/2015 | Kirkham | G06Q 10/06 |
| | | | | 706/11 |
| 2015/0281384 | A1* | 10/2015 | Gunnarsson | G06Q 10/10 |
| | | | | 709/204 |
| 2015/0302761 | A1* | 10/2015 | Lamond | G09B 5/02 |
| | | | | 434/236 |
| 2015/0317439 | A1* | 11/2015 | Kress | G06F 19/325 |
| | | | | 705/2 |
| 2016/0063097 | A1 | 3/2016 | Brown et al. | |
| 2016/0210427 | A1* | 7/2016 | Mynhier | G16H 10/60 |
| 2017/0024546 | A1 | 1/2017 | Schmidt | |
| 2017/0024656 | A1 | 1/2017 | Gilon et al. | |
| 2017/0094487 | A1* | 3/2017 | Phan | H04W 4/21 |
| 2017/0132250 | A1 | 5/2017 | Merler et al. | |
| 2017/0308648 | A1* | 10/2017 | Clarke | G06F 19/328 |
| 2017/0372443 | A1* | 12/2017 | Katsuda | G16H 10/60 |

OTHER PUBLICATIONS

IBM Cloud Catalog—Watson Services, https://console.bluemix.net/catalog/?category=watson, accessed Nov. 16, 2017, 2 pages.

Flyod health Care System, https://www-03.ibm.com/software/businesscasestudies?synkey=Y970755M45006Z37, May 17, 2017, accessed Nov. 16, 2017, 2 pages.

Mell et al., "The NIST Definition of Cloud Computing", NIST, Special Publication 800-145, Sep. 2011, 7 pages.

Bhatia, "Top 6 Regression Algorithms Used in Data Mining and Their Applications in Industry", https://analyticsindiamag.com/top-6-regression-algorithms-used-data-mining-applications-industry/, analyticsindiamag.com, Sep. 19, 2017, 7 pages.

* cited by examiner

US 10,929,817 B2

SCHEDULING PROGRAMMING EVENTS FOR USERS CLASSIFIED AS HAVING SIMILAR MEDICAL CONDITIONS UTILIZING NATURAL LANGUAGE PROCESSING

BACKGROUND

The present invention generally relates to a scheduling system, more particularly, to a scheduling approach that digitally groups users with similar attributes and preferences.

Individuals with specific preferences may desire to interact with other individuals with similar preferences. For example, individuals with certain medical issues may desire to interact with users with similar medical issues. Existing scheduling systems may not always schedule a user according to the user preferences.

SUMMARY

In an aspect of the invention, a computer-implemented method includes: receiving, by a scheduling server, user attribute information from a user computer device and service provider attribute information from a service provider computer device; analyzing, by a scheduling server, the user attribute information and the service provider attribute information based on the receiving; classifying, by a scheduling server, the user attribute information and the service provider attribute information into a digital user group based on the analyzing; and scheduling, by a scheduling server, an programming event for a user of the user computer device based on the classifying.

In another aspect of the invention, a computer program product comprising a computer readable storage medium having program instructions embodied therewith. The program instructions executable by a computer device to cause the computer device to receive Internet of things (IoT) data associated with a user, audio and visual data from a social networking site associated with the user, and medical information from a medical database associated with the user; analyze the IoT data, the audio and visual data, and the medical information based on the receiving; classify the IoT data, the audio and visual data, and the medical information based on the analyzing; and schedule an programming event for a user of the user computer device based on the classifying.

In another aspect of the invention, there is a system for digitally grouping users. The system includes: a CPU, a computer readable memory and a computer readable storage medium associated with a computing device with program instructions to receive Internet of Things (IoT) data, social networking data and medical information associated with a user; program instructions to classify the IoT data, the social networking data and the medical information based on the receiving; program instructions to create a digital user group based on the classifying; and program instructions to schedule an programming event for a user of the user computer device based on the creating of the digital user group.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
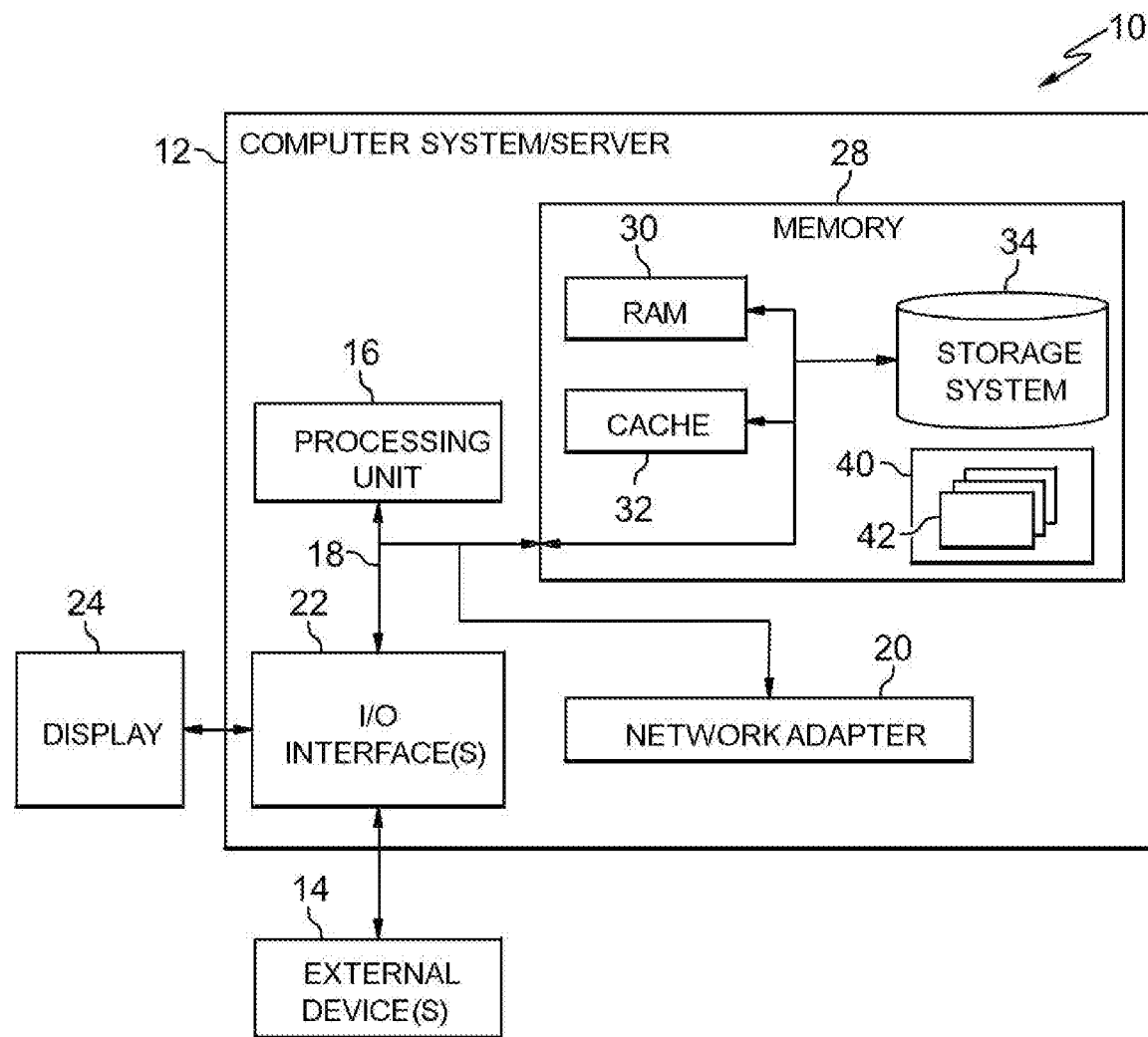
FIG. 1 depicts a cloud computing node according to an embodiment of the present invention.

The present invention generally relates to a scheduling system, more particularly, to a scheduling approach that digitally groups users with similar attributes and preferences. As described herein, embodiments of the invention provide a mechanism for digitally grouping users based on behavior based activities, preferences, and attributes. Other embodiments of the invention provide a mechanism for a user to avoid certain digital grouping based on analysis of the available data of the user.

For example, an individual with a certain medical condition may desire to interact with other individuals with a similar medical condition. However, the individual may have difficulty in finding the right opportunity to interact with the other individuals and knowing who those other individuals are may be extremely challenging. Aspects of the present invention provide a mechanism for optimal scheduling of users with similar attributers and preferences and optimal scheduling of providing services to the users by a service provider.

In aspects, the present invention provides a system and method of identifying groups of users with similar symptoms/habits and the impact (e.g., physical or emotional) of those symptoms on the daily life of the users. Implementations of the present invention improve the calendaring and social networking for identified digital user groups based on determining that the users in the identified digital user groups would join or not join the identified digital user groups.

As described herein, the present invention may be used by a service provider (e.g., a physician, a physical therapist, a medical group, etc.) to digitally groups users based on behavior based activities, preferences, and attributes and in accordance with the scheduling preferences of the service provider. Aspects of the present invention provide a mechanism for optimal scheduling of users based on the services and scheduling preferences of the service provider and the requirements of the users. For example, the service provider may prefer to provide services to individuals with a certain medical condition (e.g., physical therapy) during a certain time. Aspects of the present invention permit scheduling of the individual with the service provider based on the time preferences of the service provider.

To the extent that implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
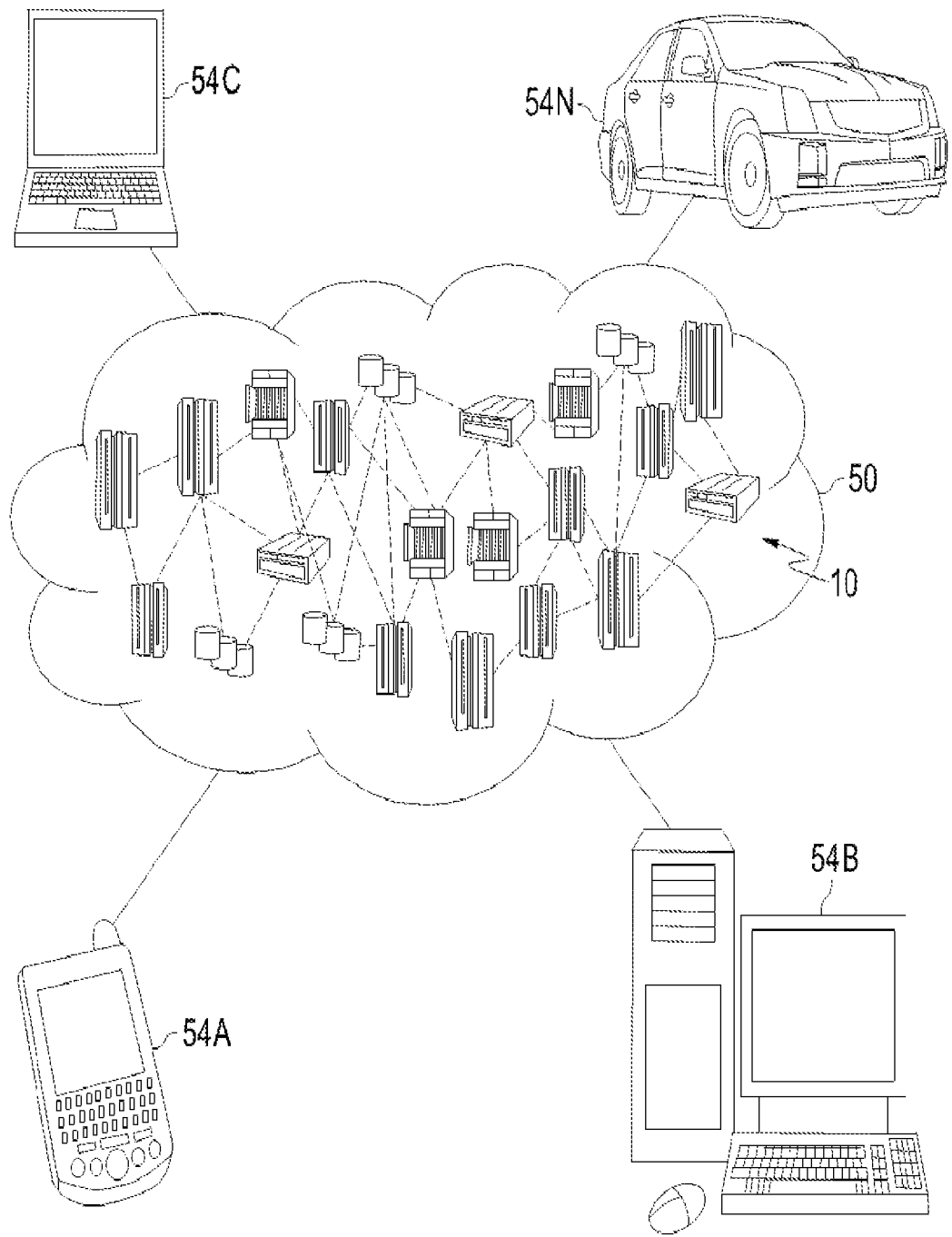
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
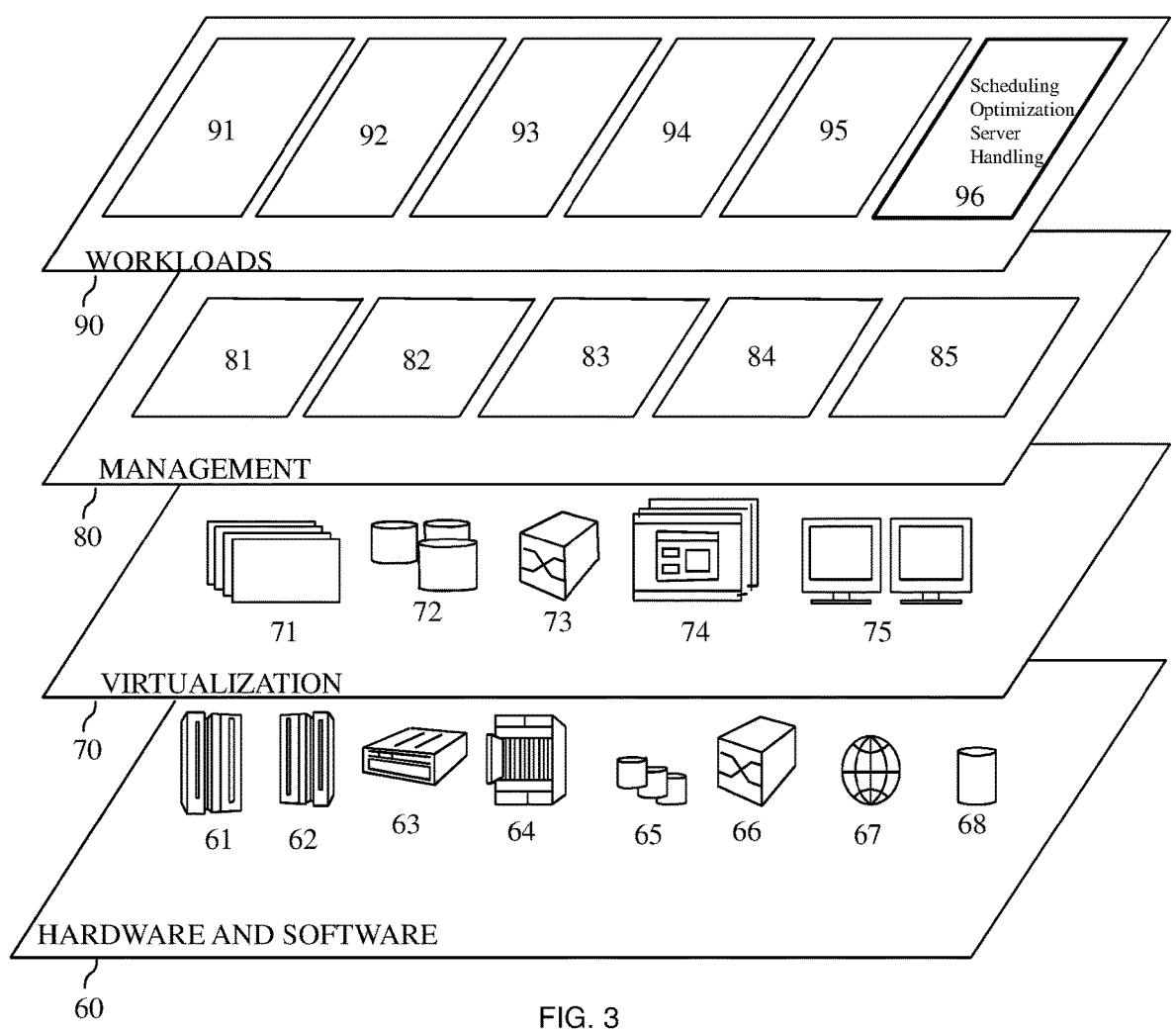
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and scheduling optimization server handling 96.

Referring back to FIG. 1, the program/utility 40 may include one or more program modules 42 that generally carry out the functions and/or methodologies of embodiments of the invention as described herein (e.g., such as the functionality provided by scheduling optimization server handling 96). Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a scheduling optimization server as shown in FIG. 4.

Figure 4:
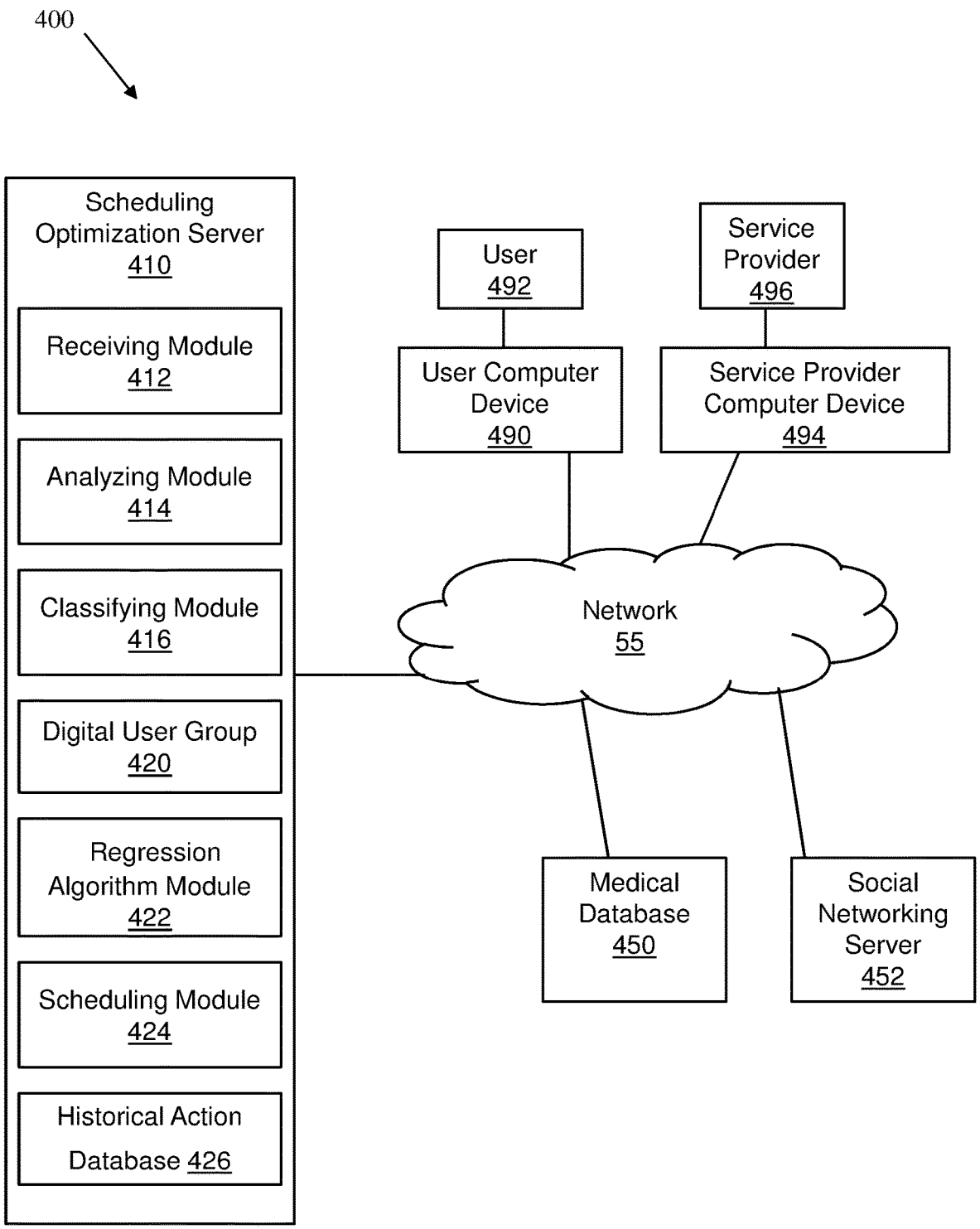
FIG. 4 shows an example environment and an overview of an example implementation in accordance with aspects of the present invention.

FIG. 4 shows an example environment 400 and an overview of an example implementation in accordance with aspects of the present invention. In embodiments, the present invention provides a mechanism for digitally grouping users with similar attributes and preferences (e.g., medical condition, habits, etc.) and scheduling events (e.g., with a service provider or other locations) for the users based on the attributes and preferences. The present invention receives and analyzes the attributes and preferences of the user such as formal diagnoses (e.g., medical conditions of the user), activities (e.g., physical therapy, running, amount of sleep of the user), and other available data (e.g., diet, medications taken of the user).

Based on analyzing the attributes and preferences of the user, the present system digitally groups the user with other users having similar attributes and preferences in a digital user group and schedules events (e.g., a sporting ceremony already being attended by the user and the other users) for the digital user group. The present invention analyzes the attributes and preferences of the user and provides a mechanism where the user may mingle and discuss their shared medical condition and remedies for the medical condition at a service provider or other location.

The exemplary environment includes a scheduling optimization server 410 which may comprise a computer system 12 of FIG. 1, and may be connected to a network 55 (e.g., via the network adapter 20 of FIG. 1). The network 55 may be any suitable communication network or combination of networks, such as a local area network (LAN), a general wide area network (WAN), a public network (e.g., the Internet), a 3G network, a Long-Term Evolution (LTE) network, and/or a 5G network.

The scheduling optimization server 410 may comprise a plurality of modules configured to perform one or more functions described herein. In aspects, the scheduling optimization server 410 may include additional or fewer modules than shown in FIG. 4. In aspects, separate components may be integrated into a single computing component or module. Additionally, or alternatively, a single module may be implemented as multiple computing components or modules (e.g., program modules 42 of FIG. 1).

In embodiments, the scheduling optimization server 410 includes a receiving module 412, an analyzing module 414, a classifying module 416, a digital user group 420, a regression algorithm module 422, a scheduling module 424, and a historical action database 426. The scheduling optimization server 410 is configured for communication via the network 55 with a medical database 450, at least one social networking server 452, a user computer device 490, and a service provider computer device 494. The user computer device 490 and the service provider computer device 494 may be, for example, personal digital assistants (PDA), cellular telephones, laptop computers, tablet computers, and/or computer systems that may communicate with the scheduling optimization server 410 over the network 55.

In embodiments, the medical database 450 includes the formal medical history of a user 492 or any applicable data of the user 492 used by scheduling optimization server 410 for analysis as described herein. For example, the medical database 450 may include a list of prescriptions currently being used by the user 492, corresponding side effects for the list of prescriptions, medical records of the user 492, emergency contact information for the user 492, etc. The data on the medical database 450 may accessed by the scheduling optimization server 410 over the network 55.

In embodiments, the social networking server 452 includes social networking servers used by the user 492 used by scheduling optimization server 410 for performing the analysis described herein. For example, the social networking server 452 may include personal networking sites, professional networking sites, etc. The data on the social networking server 452 may accessed by the scheduling optimization server 410 over the network 55.

In aspects, the scheduling optimization server 410 communicates with the user computer device 490 via the network 55. The receiving module 412 receives user attribute information about the user 492 from the user computer device 490 and service provider attribute information from the service provider computer device 494. Based on receiving the user attribute information and the service provider attribute information, the analyzing module 414 analyzes the user attribute information and the service provider attribute information to provide a fully configured profile of the user attribute information and the service provider attribute information. The fully configured profile may be used to classify the user attribute information and the service provider attribute information. In this manner, implementations of the present invention provide for optimal calendaring and scheduling of users based on the preferences of the user and preferences of the service provider.

Based on analyzing the user attribute information and the service provider attribute information, the classifying module 416 classifies the user attribute information and the service provider attribute information into the digital user group 420 based on analyzing the user attribute information and the service provider attribute information. Based on classifying the user attribute information and the service provider attribute information, the regression algorithm module 422 applies a regression algorithm to the user attribute information and on the historical action database 426 and provides a probability that the user 492 would have a high or low probability of joining and participating in the digital user group 420. Based on classifying the user attribute information and the service provider attribute information and applying the regression algorithm to the user attribute information, the scheduling module 424 schedules a programming event for the user 492 on the user computer device 490.

Figure 5:
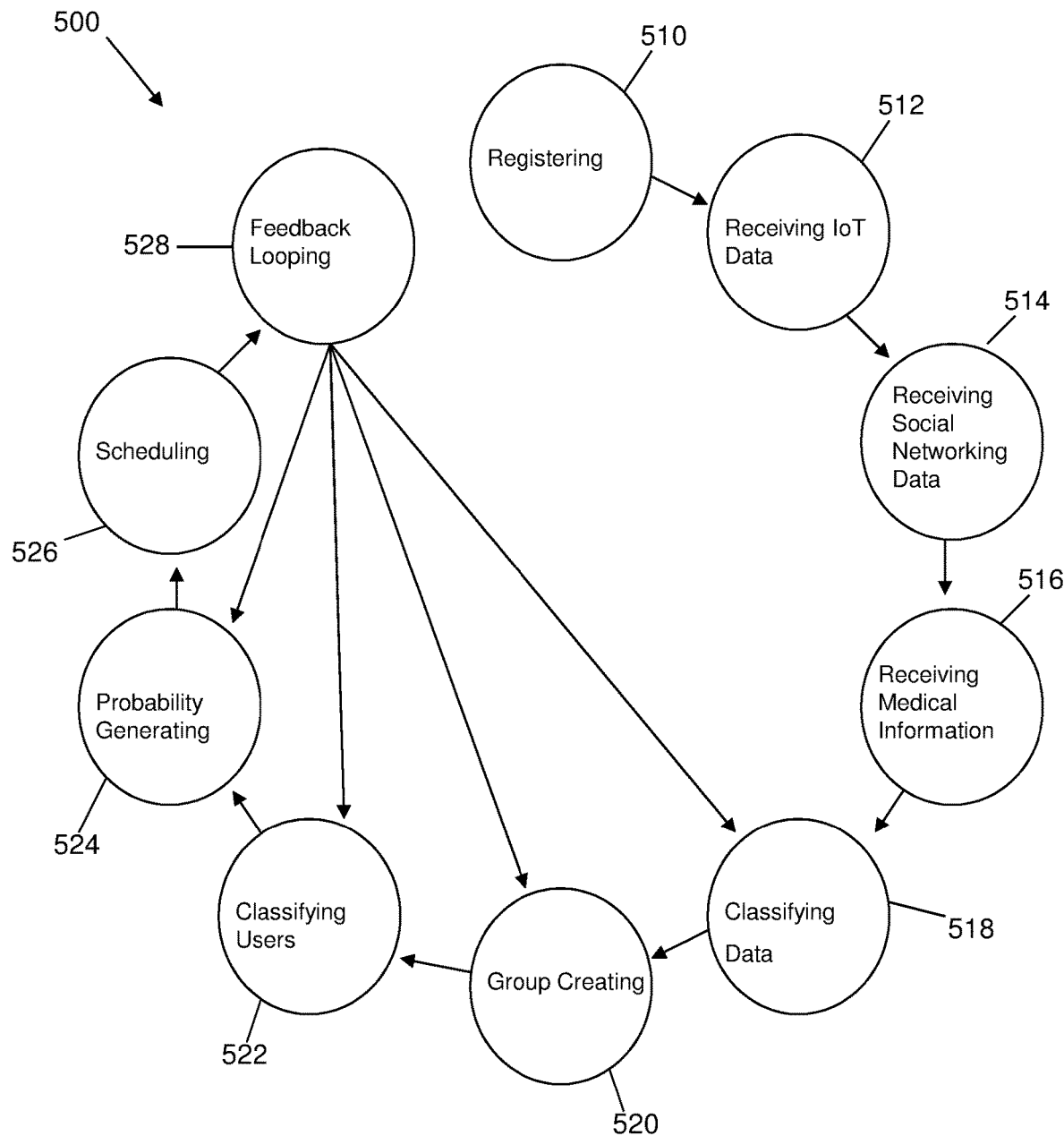
FIG. 5 shows a circle diagram of an example implementation of the scheduling optimizing server in accordance with aspects of the present invention.

FIG. 5 shows a circle diagram of an example implementation of the scheduling optimizing server in accordance with aspects of the present invention. Steps of the method of FIG. 5 may be performed in the environment illustrated in FIG. 4, and are described with reference to the elements shown in FIG. 4.

At step 510, the receiving module 412 of the scheduling optimization server 410 registers user attribute information about the user 492. By way of example, the user 492 registers, on a voluntary basis, the user attribute information with the scheduling optimization server 410. The user attribute information may include name, symptoms, and types of locations the user 492 would be comfortable when interacting with others (e.g., physical therapy sessions in an office environment, web-based online discussion services, sporting events, etc.).

Additionally, the user 492 may link personal Internet of things (IoT) devices for communication with the scheduling optimization server 410 over the network 55. The personal IoT devices may include devices that have sensors that record personal information (e.g., glucose monitor, fitness computer wristband, etc.) and may be configured to publish the personal information or transmit the personal information to the scheduling optimization server 410.

In aspects, the user 492 may register the social networking site utilized by the user 492 and allow access to information in the social networking sites to the scheduling optimization server 410. The social networking sites may include personal social networking sites and professional social networking sites.

The user 492 may register other user attribute information and user preferences with the scheduling optimization server 410 via the user computer device 490. For example, the user attribute information and the user preferences may include time of day to discuss a topic, current calendar of the user 492 on the user computer device 490, the location where to discuss the topics, etc. In aspects, based on registering the user attribute information, the user 492 may provide a fully configured user profile for processing by the scheduling optimization server 410.

Still referring to step 510, the receiving module 412 of the scheduling optimization server 410 registers service provider attribute information about the service provider 496. By way of example, the service provider 496, on a voluntary basis, registers the service provider attribute information with the scheduling optimization server 410. The service provider attribute information may include, for example, business name of the service provider 496, availability of the service provider 496, IoT devices of the service provider 496, and patient preferences and limitations of the service provider 496 (e.g., patient preference down to the individual employee of the service provider 496), and skills of the service provider 496.

Additionally, the service provider 496 may link service provider IoT devices for communication with the scheduling optimization server 410 over the network 55. The service provider IoT devices may include devices that have sensors that record service provider information (e.g., hospital medical monitors, physical therapy monitors, etc.) and may be configured to publish the service provider information or transmit the service provider information to the scheduling optimization server 410. In aspects, the service provider 496 may provide access to information on a calendar residing on the service provider computer device 494, business phones of the service provider 496, business computer tablets of the service provider 496, etc.

The service provider 496 may also register other service provider attribute information and service provider preferences with the scheduling optimization server 410 via the service provider computer device 494. For example, the service provider attribute information and the service provider preferences may include the business name, skills and limits of the service provider 496, and priority ranking of the service provider attribute information of the service provider 496. In aspects, based on registering the user attribute information, the service provider 496 may provide a fully configured service provider profile for processing by the scheduling optimization server 410.

In aspects, the scheduling optimization server 410 may also register a relative weighting between the service provider attribute information provided by the service provider 496 and the user attribute information provided by the user 492. For example, the receiving module 412 may register a scope and factor scoring of the service provider attribute information relative to the user attribute information. By way of an example, the scheduling optimization server 410 registers the service provider attribute information (e.g., service provider calendaring preferences, types of services that may be provided, etc.) and the user attribute information (e.g., user calendar preferences, medical requirement of the user, location preferences of the user, etc.,) and registers the relative weighting (e.g., the scoring) of the service provider attribute information relative to the user attribute information.

As described herein, based on registering user attribute information about the user 492, the receiving module 412 receives the ability to access personal IoT devices of the user 492, social networking sites of the user 492, medical records of the user 492 from the medical database 450, and personal calendars of the user 492 (e.g., the calendar on the user computer device 490). In aspects, the user attribute information includes credential information (e.g., user name, passwords, etc.) that facilities access to the personal IoT devices of the user 492, social networking sites of the user 492, medical records of the user 492 from the medical database 450, and personal calendars of the user 492.

Based on registering the service provider attribute information about the service provider 496, the receiving module 412 receives the ability to access service provider IoT devices of the service provider 496, social networking sites of the service provider 496, and service provider calendars of the service provider 496 (e.g., the calendar on the user computer device 490). In aspects, the service provider attribute information includes credential information (e.g., user name, passwords, etc.,) that facilities access to the service provider IoT devices of the service provider 496, social networking sites of the service provider 496, and service provider calendars of the service provider 496.

At step 512, based on registering the user attribute information and the service provider attribute information at step 510, the scheduling optimization server 410 receives IoT data from the IoT devices of the user 492 and receives IoT data from the IoT devices of the service provider 496. For example, the receiving module 412 receives IoT data from glucose monitor of the user 492 and IoT data from the hospital medical monitor of the service provider 496.

In aspects, the IoT data received by the receiving module 412 may include medical information of the user 492 which may be further processed by the scheduling optimization server 410. For example, the receiving module may receive medical information from a glucose monitor which provides medical information such as blood sugar information, reactions to medications, and inferences that the user 492 is tired or resting, etc. In embodiments, the output of step 512 may be properly populated IoT data, which may be further processed by the scheduling optimization server 410.

At step 514, based on registering the user attribute information and the service provider attribute information, the scheduling optimization server 410 receives social networking data about the user 492 and the service provider 496. For example, the receiving module 412 receives social networking data about the user 492 and the service provider 496 from the social networking server 452.

In aspects, based on registering user attribute information, the receiving module 412 receives audio data and video data stored on the social networking sites (e.g., a video stream of the user 492 while the user 492 experiences a medical problem) of the user 492. In aspects, based on registering service provider attribute information, the receiving module 412 receives audio data and video data stored on the social networking sites of the service provider 496. In embodiments, the output of step 514 may be social networking data, which may be further processed by the scheduling optimization server 410.

Optionally, the receiving module 412 receives audio and visual data specifically selected by the user 492 according to authorization filters designed by the user 492. For example, the receiving module may receive a video stream of an allergy attack which may designated by the user 492 to be processed by the scheduling optimization server 410.

At step 516, based on registering the user attribute information and the service provider attribute information, the scheduling optimization server 410 receives medical information about the user 492. In aspects, based on registering user attribute information and service provider attribute information, the receiving module 412 receives medical information (e.g., from IoT devices of the user 492 or the medical database 450) about the user 492. In an aspect, the receiving module 412 receives the medical information about the user 492 from the user computer device 490 based on the scope of the medical information designated by the user 492 (e.g., information entered or registered by the user 492). In another aspect, the receiving module 412 receives the medical information about the user 492 from the medical database 450 over the network 55. In embodiments, the output of step 516 may be individualized medical history data of the user 492, which may be further processed by the scheduling optimization server 410.

At step 518, based on receiving IoT data from the IoT devices (e.g., the user computer device 490 and the service provider computer device 494), the analyzing module 414 analyzes the IoT data to determine the type of medical condition of the user 492. For example, the analyzing module 414 may analyze the data provided by the glucose monitor of the user 492 such as blood sugar information, reactions to medications, and inferences that the user 492 is tired or resting, etc.

In aspects, based on receiving audio and visual data from the IoT devices, the analyzing module 414 analyzes the audio and visual data to determine a type of medical condition of the user 492. In aspects, the analyzing module 414 analyzes the audio and visual data using cognitive analysis (e.g., natural language processing (NLP), image recognition processing, etc.). For example, the analyzing module 414 may analyze the video stream of the user 492 and determine that the user 492 is experiencing a medical problem (e.g., an allergy attack, a low blood sugar levels, high heart rate, etc.,).

Based on receiving medical information (e.g., from IoT devices of the user 492 or the medical database 450) about the user 492, the analyzing module 414 analyzes the medical information. In aspects, the analyzing module 414 analyzes the medical information (e.g., the qualifying and appropriate medical data of the user 492) provided by the user 492 and the medical database 450 and determines the type and symptoms of a medical condition. For example, the analyzing module 414 may analyze the medical information of the user 492 and the medical database 450 and determines that the user 492 has an allergy to pollen.

Still referring to step 518, based on receiving and analyzing IoT data, social networking data and medical information, the scheduling optimization server 410 classifies the IoT data, social networking data and medical information. In aspects, based on analyzing the IoT data of the IoT device (e.g., the user computer device 490), the audio and visual data and the medical information, the classifying module 416 classifies the user 492 into a digital user group 420. In aspects, the classifying module 416 classifies the IoT data, the audio and visual data and the medical information of the user 492 according to artificial intelligence classification of data. In embodiments, the classifying module 416 uses an iterative analysis process on the IoT data, the audio and visual data and the medical information that produces a learning loop for the scheduling optimization server 410, and classifies the user 292 into an optimal digital group (e.g., the digital user group 420).

In aspects, the classifying module 416 utilizes conversation processing on the audio data received from the user computer device 490 and the social networking server 452, and utilizes alchemy language processing on the language of the audio data received from the user computer device 490. In additional aspects, the classifying module 416 utilizes a Natural Language Classifier (NLC) to account for personal characteristics of the user 492, and utilizes Natural Language Understanding (NLU) to capture emotions of the user 492.

In aspects, the classifying module 416 utilizes visual recognition (e.g., image recognition) processing on the video data from the user computer device 490 and the social networking server 452 to capture the similarities and differences of the user 492 with other users of the scheduling optimization server 410. In additional aspects, the classifying module 416 utilizes discovery processing to extract value from the unstructured IoT data, the audio and visual data and the medical information (e.g., by converting, normalizing, and enriching the IoT data, the audio and visual data and the medical information). In embodiments, the output of step 518 may be classified data (e.g., user categorized and associated with groups deemed application to the defined scope of the classification), which may be further processed by the scheduling optimization server 410.

At step 520, based on classifying the IoT data, the audio and visual data and the medical information of the user 492, the scheduling optimization server 410 creates the digital user group 420. For example, the classifying module 416 creates the digital user group 420 based on the digital user group not existing and based on the IoT data, social networking data and medical information of the user 492.

In aspects, the classifying module 416 creates the digital user group 420 based on the classifying of the IoT data, the audio and visual data and the medical information of the user 492 using the standard artificial intelligence of conversation processing, alchemy language processing, the NLC, NLU, visual recognition processing, and discovery processing. In aspects, the classifying module 416 creates the digital user group 420 based on examining the user attribute information of the user 492 and comparing the user attribute information of the user 492 to other user attribute information of other users of the scheduling optimization server 410. The classifying module 416 compares, in a descending order, user attribute information of the user 492 and other users of the scheduling optimization server 410 and creates the digital user group 420 when no digital user group exists. In embodiments, the output of step 520 may be creation of the digital user group 420, which may be further processed by the scheduling optimization server 410.

At step 522, based on creating the digital user group 420, the scheduling optimization server 410 classifies the user 492 into the digital user group 420. For example, the classifying module 416 classifies the user 492 into the digital user group 420 based on an analysis of the IoT data, the audio and visual data and the medical information of the user 492.

In aspects of the invention, based on comparing the user attribute information of the user 492 and other users of the scheduling optimization server 410, the classifying module 416 creates a classification profile of the digital user group 420, classifies the user 492 into the digital user group 420, and stores the classification profile of the digital user group 420. In some aspects, the classifying module 416 may classify the user 492 into additional user groups other than the digital user group 420.

In aspects, the classifying module 416 may classify plural different users and plural different service providers to populate plural different user groups. For example, the classifying module 416 may classify any number of users along with any number of service providers that may be classified an any number of digital user groups.

Based on classifying the user 492 in the digital user group 420, the scheduling optimization server 410 allows the ability for the user 492 to access the digital user group 420. In aspects, the access to the digital user group 420 may be via computerized interface on the user computer device 490 which communicates with the scheduling optimization server for 410 over the network 55. The ability of the user 492 to access the digital user group 420 does not imply that the user 492 prefers to interact with other users in the digital user group 420. In embodiments, the output of step 522 may be classification of the user 492 into the digital user group 420, which may be further processed by the scheduling optimization server 410.

At step 524, based on classifying the user 492 into the digital user group 420, the scheduling optimization server 410 provides the probability that the user 492 would join the digital user group 420. For example, the regression algorithm module 422 applies a regression algorithm to the user profile of the user 492 and provides the probability that the user 492 would join the digital user group 420.

As disclosed herein, based on creating the digital user group 420, the regression algorithm module 422 applies a regression algorithm to the user attribute information of the user 492 and provides a probability that the user 492 would have a high or low probability of joining and participating in the digital user group 420. The regression algorithm module 422 determines the probability of the user 492 would participate in activities or conversations with other users in the digital user group 420 based on applying the regression algorithm on the user attribute information of the user 492 and on the historical action database 426. The historical action database 426 stores a historical record of the user 492 joining and participating in digital user groups.

In aspects, the regression algorithm module 422 applies the regression algorithm to the user attribute information of the user 492 and determines the probability of the user 492 participating in the digital user group 420. The regression algorithm module 422 applies the regression algorithm on the historical reactions of the user 492 in the historical action database 426 (e.g., the probability of the user 492 attending an event at a specific time) and determines the probability of joining and participating in the digital user group 420. The regression algorithm module 422 compares the highest probability concentrations of the user attribute and determines the probability, in descending order, that the user 492 would join and participate in the digital user group 420 or other digital groups. In embodiments, the output of step 524 may be predictions in descending order of a probability that the user 492 would join and participate in the digital user group 420, which may be further processed by the scheduling optimization server 410.

At step 526, based on determining the probability that the user 492 would join the digital user group 420, the scheduling optimization server 410 schedules programming events for the user 492. In aspects, based on applying the regression algorithm to the user attribute information of the user 492 and determining the probability of participating in the digital user group 420, the scheduling module 424 schedules programming events for the user 492 that would allow for interaction of the user 492 with other users in the digital user group 420. The interaction of the user 492 may be based on the user attribute information of the user 492 and include types of interaction with other users of the digital user group 420 and distance from other users in the digital user group 420.

In aspects, to determine the scheduling of programming events, the scheduling module 424 receives meeting requests entries in the calendar of the user computer device 490 and the calendar of the service provider computer device 494 for the service provider 496. Based on receiving the meeting requests entries, the scheduling module 424 determines possible digital group combinations (e.g., the digital user group 420) for the user 492.

In aspects, the scheduling module 424 compares the user attribute information of the user 492 with the user attribute information of other users in the digital user group 420. In other aspects, the scheduling module 424 compares the user attribute information of the user 492 with the service provider attribute information of the service provider 496.

Based on comparing the user attribute information of the user 492 with the user attribute information of other users in the digital user group 420 and with the service provider attribute information of the service provider 496, the scheduling module 424 transmits the programing event for the user 492 to the user computer device 490. The programing event may be listed according to a weighted priority ranking (e.g., differentiate ranking based on descending best/worst numerical ranking order or color order). The scheduling module 424 displays the programing event on the user computer device 490 and the service provider computer device 494 according the weighted priority ranking.

Based on receiving the programing event, the user 492 selects or does not select attending the programing event to the user computer device 490 (e.g., by adding programing event on the calendar of the user computer device 490). Based on receiving the programing event, the service provider 496 selects or does not select adding the programing event to the service provider computer device 494 (e.g., by adding programing event on the calendar of the service provider computer device 494). In embodiments, the output of step 526 may be a scheduled or rejected appointments for the user 492, which may be further processed by the scheduling optimization server 410.

At step 528, based on classifying data, creating the digital user group 420, classifying the user 492, determining the probability that the user 492 would join the digital user group 420, and scheduling programming events for the user 492, the scheduling optimization server 410 uses an iterative process to create a feedback loop. For example, scheduling module 424 uses the baseline of the feedback loop and schedules future programming events on the calendar of the user computer device 490 for the user 492.

As described herein, the scheduling optimization server 410 stores the outcomes from the receiving module 412, the analyzing module 414, the classifying module 416, and the scheduling module 424 to the historical action database 426 of the user 492 for future analysis. In this manner, the scheduling optimization server 410 may record a baseline for scheduling programing events to be used as a feedback loop for the analyzing module 414, the classifying module 416, and the scheduling module 424. In aspects, the analyzing module 414, the classifying module 416, and the scheduling module 424 may utilize the baseline of the user 492 stored in the historical action database 426 in analyzing, classifying, and scheduling programing events for the user 492 in the user computer device 490.

The following use cases are provided as examples that illustrate various aspects of the present invention. Implementations of the invention are not limited to the aspects described in these use cases, and other aspects will become apparent from the description that follows.

In an exemplary use case, a 40 year old user with a torn rotator cuff requires physical therapy. The 40 year old user prefers to have physical therapy sessions with others that have gone through the same injury and prefers a therapist of a same gender for the physical therapy sessions. Additionally, the 40 year old user prefers a morning appointment for the physical therapy session but does not require a morning session. The present invention analyzes the profile of the 40 year old user during an initial session and determines that the 40 year old user can have a physical therapy session with a suitable therapist in the afternoon with others with similar injuries or a physical therapy session in the morning without others with the same injury. Based on the analysis of the profile of the 40 year old user, the present invention recommends the afternoon physical therapy session.

In another exemplary use case, a user with diabetes desires going to a camp with other people with a similar medical condition. The user has trouble with low blood sugar levels and would like to eat with others who are facing similar problems. The present invention analyzes the profiles of all of the campers that have registered, and based on the analysis of the profile, schedules meals for the user with other campers who have low blood sugar readings at the same location.

In another exemplary use case, a physical therapist has a service provider profile registered with the present invention that limits physical therapy sessions for upper body strength training to three hours in a row. On a given day when a patient attempts to schedule a physical therapy sessions for upper body strength training, the present invention marks the hour before and after the three hour block as unavailable, despite fitting in with preferences for the patient. As described herein, the present invention analyzes the attributes and preferences of the service provider and provides a mechanism where the service provider provides services to the user based on the attributes and preferences of the service provider.

In another exemplary use case, a 30 year old user with cancer requires cancer treatment at a health care facility. The 30 year old user does not want to eat with others facing similar cancer treatment. Based on the preferences of the 30 year old user and information received from the IoT devices of the user, the present system predicts that the 30 year old user would not like to sit with other facing similar cancer treatments and schedules the seating arrangement at the health care facility accordingly. As described herein, the present invention analyzes information of the user and predicts the probability of the user in joining the digital user group or the probability of receiving the most benefit from joining the digital user group.

In another exemplary use case, a 40 year old user with cancer requires cancer treatment at a health care facility. The 40 year old user does want to eat with others facing similar cancer treatment, but absolutely will not eat with a person who constantly talks about their disease. Based on analyzing captured conversations of individuals at the health care facility, the present invention determines that a 35 year old user is undergoing similar cancer treatments but constantly discuss his health. The present invention determines not schedule social events between the 40 year old user and the 35 year old user, but schedules social events with other individuals in the health care facility who are having the same cancer treatment and do not constantly discuss their health issues. As described herein, the present invention may also schedule events for the digital user group that are unknown to the users in the digital user group (e.g., support groups, outings, impromptu opportunities, etc.).

In another exemplary use case, a 25 year old user begins working out but does not want to work out with people in significant better aerobic shape. In aspects, the present invention captures the user's fitness data from a wearable fitness IoT device and determines fitness attributes of the user (e.g., heart rate, and exercise length, etc.). The present invention compares the fitness attributes of the user with fitness attributes of other individuals (e.g., individuals working out with a personal trainer) and recommends a scheduling slot where individuals with similar fitness attributes are exercising.

Figure 6:
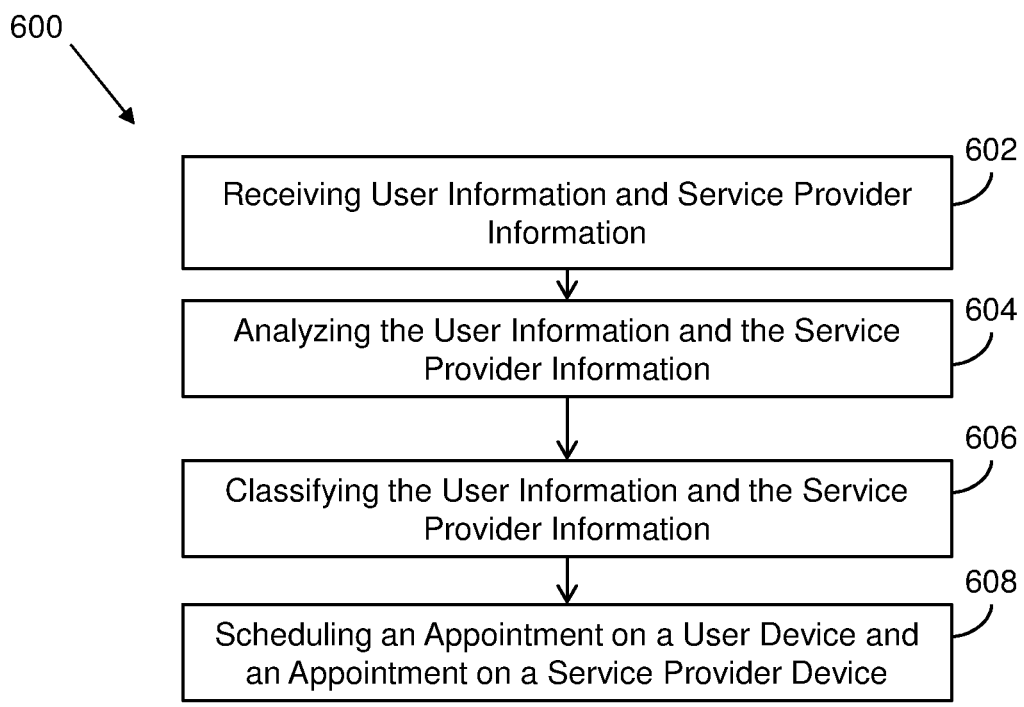
FIG. 6 shows a flowchart of steps of an exemplary method in accordance with aspects of the present invention.

FIG. 6 shows an example flowchart of a general process for enabling the scheduling optimizing server in accordance with aspects of the present invention. Steps of the method of FIG. 6 may be performed in the environment illustrated in FIG. 4, and are described with reference to the elements shown in FIG. 4.

At step 602, the scheduling optimization server 410 receives user attribute information of the user 492 from the user computer device 490 and receives service provider attribute information of the service provider 496 from the service provider computer device 494. In aspects, as described with respect to FIG. 4 and steps 510-512 of FIG. 5, the receiving module 412 receives user attribute information from the user computer device 490 and receives service provider attribute information from the service provider computer device 494.

For example, the receiving module 412 receives user attribute information (e.g., medical information about the user 492, current calendar of the user 492 on the user computer device 490, location where to discuss the medical information, etc.) from the user 492 for scheduling a meeting. In aspects, the receiving module 412 receives service provider attribute information (e.g., preferences of the service provider 496, current calendar of the service provider 496 on the service provider computer device 494, etc.) from the service provider 496 for scheduling a meeting.

At step 604, the scheduling optimization server 410 analyzes the user attribute information received from the user computer device 490 and analyzes the service provider attribute information of the service provider 496 from the service provider computer device 494. In aspects, as described with respect to FIG. 4 and steps 518-524 of FIG. 5, based on receiving the user attribute information of user 492 and the service provider attribute information of service provider 496, the analyzing module 414 analyzes the user attribute information and the service provider attribute information and the service provider attribute information to pro a fully configured profile of the user attribute information and the service provider attribute information, which may be used to classify the user attribute information and the service provider attribute information.

For example, the analyzing module 414 analyzes medical information of the user 492 from the IoT device of the user 492, the calendar on the user computer device 490 of the user 492 to provide a fully configured profile of the user 492. In another example, the analyzing module 414 analyzes the preferences of the service provider 496 and the calendar on the service provider computer device 494 of the service provider 496 to provide a fully configured profile of the service provider 496.

At step 606, the scheduling optimization server 410 classifies the fully configured profile of the user attribute information and the service provider attribute information into a plurality of digital user groups. In aspects, as described with respect to FIG. 4 and steps 518-524 of FIG. 5, based on analyzing the user attribute information and the service provider attribute information, the classifying module 416 classifies the fully configured profile of the user attribute information and the service provider attribute information into the digital user group 420.

For example, the classifying module 416 classifies medical information of the user 492 on the IoT devices of the user 492 and the calendar on the service provider computer device 494 of the service provider 496. Based on classifying the medical information and the calendar on the service provider computer device 494, the classifying module 416 classifies the user 492 into the digital user group 420.

At step 608, the scheduling optimization server 410 schedules an appointment for the user 492 on the user computer device 490. In aspects, as described with respect to FIG. 4 and step 526 of FIG. 5, based on classifying the user attribute information and the service provider attribute information, the scheduling module 424 schedules a programming event for the user 492 on the user computer device 490.

For example, based on classifying the user 492 into the digital user group 420, the scheduling module 424 schedules an appointment for the user 492 on the user computer device 490 where the user 492 may discuss medical information with other users in the digital user group. The appointment also be scheduled in the service provider computer device 494.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
    receiving, by a scheduling server, user attribute information from a remote user computer device on a network and service provider attribute information from a remote service provider computer device on the network, wherein the user attribute information includes Internet of things (IoT) data associated with a user and generated by at least one IoT device on the network;
    analyzing, by the scheduling server, the user attribute information and the service provider attribute information utilizing natural language processing to determine one or more attributes of the user;
    classifying, by the scheduling server, the user into a digital user group associated with the one or more attributes of the user based on the analyzing;
    creating, by the scheduling server, a digital user group based on the classifying;
    accessing, by the scheduling server, a historic action database storing a historical record of the user joining and participating in other digital user groups;
    determining, by the scheduling server, a probability that the user will join and participate in the digital user group based on the historic record of the user joining and participating in other digital user groups;
    displaying, by the scheduling server, a programing event to the user for selection via a user interface based on the classifying and the probability;
    receiving, by the scheduling server, a selection of the programming event from the user;
    updating, by the scheduling server, the historic record of the user joining and participating in other digital user groups based on the selection; and
    scheduling, by the scheduling server, a programming event for the user on a calendar of the remote user computer device based on the selection.

2. The method of claim 1, wherein the user attribute information comprises one or more selected from a group consisting of: name, symptoms, time of day to discuss a topic, current calendar of on the user computer device, and a location where to discuss topics.

3. The method of claim 1, wherein the service provider attribute information comprises one or more selected from a group consisting of: a business name, skills and limits, and priority ranking of a service provider.

4. The method of claim 1, wherein the receiving further comprises receiving audio and visual data from a social networking site associated with the user, and medical information from a medical database associated with the user.

5. The method of claim 4, wherein the analyzing further comprises analyzing the audio and visual data from the social networking site associated with the user, and the medical information from the medical database associated with the user.

6. The method of claim 5, wherein the classifying further comprises classifying the audio and visual data from the social networking site associated with the user, and the medical information from the medical database associated with the user.

7. The method of claim 6, wherein the classifying further comprises utilizing at least one selected from a group consisting of: conversation processing, alchemy language processing, visual recognition processing, and discovery processing.

8. The method of claim 7, wherein the creating the digital user group is further based on the classifying of the the audio and visual data from the social networking site associated with the user, and the medical information from the medical database associated with the user.

9. The method of claim 1, wherein the classifying further comprises creating a classification profile of the user and storing the classification profile of the user.

10. A computer program product comprising a computer readable storage medium having program instructions embodied therewith, the program instructions executable by a computer device to cause the computer device to:
receive user attribute information from a remote user computer device on a network, the user attribute information including: Internet of things (IoT) data associated with a user generated by at least one IoT device on the network and service provider attribute information from a remote service provider computer device on the network;
analyze the user attribute information and the service provider attribute information utilizing natural language processing to determine one or more attributes of the user;
classify the user into a digital user group associated with the one or more attributes of the user based on the analyzing;
create a digital user group based on the classifying;
access
a historic action database storing a historical record of the user joining and participating in other digital user groups;
determine a probability that the user will join and participate in the digital user group based on a historic record of the user joining and participating in other digital user groups;
display a programing event to the user for selection via a user interface based on the classifying and the probability;
receive a selection of the programming event from the user;
update the historic record of the user joining and participating in other digital user groups based on the selection; and
schedule the programming event for the user on a calendar of the remote user computer device based on the selection.

11. The computer program product of claim 10, further comprising applying a regression algorithm to the historic record to determine the probability.

12. The computer program product of claim 10, further comprising transmitting the programming event to the user computer device over the network.

13. A system comprising:
a CPU, a computer readable memory and a computer readable storage medium associated with a computing device;
program instructions to receive user attribute information from a remote user computer device on a network and service provider attribute information from a remote service provider computer device on the network, wherein the user attribute information includes Internet of things (IoT) data associated with a user generated by at least one IoT device on the network;
program instructions to analyze the user attribute information and the service provider attribute information utilizing natural language processing to determine one or more attributes of the user;
program instructions to classify the user into a digital user group associated with the one or more attributes of the user based on the analyzing;
program instructions to create the digital user group based on the classifying;
program instructions to access a historic action database storing a historical record of the user joining and participating in other digital user groups;
program instructions to determine a probability that the user will join and participate in the digital user group based on the historic record of the user joining and participating in other digital user groups;
program instructions to determine a probability that the user will join and participate in the digital user group based on the historic record of the user joining and participating in other digital user groups;
program instructions to display a programming event to the user for selection via a user interface based on the classifying and the probability;
program instructions to receive a selection of the programing event from the user;
program instructions to update the historic record of the user joining and participating in other digital user groups based on receiving the selection; and
program instructions to schedule a programming event for the user on a calendar of the remote user computer device based on the selection.

14. The system of claim 13, further comprising transmitting the programming event to the user computer device over the network.

15. The system of claim 13, further comprising displaying the programming event on the user computer device according to a weighted priority ranking.

16. The method of claim 1 further comprising:
wherein the displaying the programming event to the user for selection includes displaying multiple programming events to the user based on a weighted priority ranking.

17. The computer program product of claim 10, wherein the displaying the programing event to the user for selection includes displaying multiple programming events listed according to a weighted priority ranking.

* * * * *